United States Patent
Hartog et al.

(10) Patent No.: US 7,595,865 B2
(45) Date of Patent: Sep. 29, 2009

(54) OPTICAL TIME DOMAIN REFLECTOMETRY FOR TWO SEGMENT FIBER OPTIC SYSTEMS HAVING AN OPTICAL AMPLIFIER THEREBETWEEN

(75) Inventors: Arthur H. Hartog, Winchester (GB); Peter C. Wait, Salisbury (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/872,092

(22) Filed: Oct. 15, 2007

(65) Prior Publication Data
US 2008/0030739 A1 Feb. 7, 2008

Related U.S. Application Data

(62) Division of application No. 10/502,616, filed as application No. PCT/GB03/00385 on Jan. 3, 2003, now Pat. No. 7,304,725.

(51) Int. Cl.
*G01N 21/00* (2006.01)
(52) U.S. Cl. .................................... 356/73.1
(58) Field of Classification Search ............. 356/73.1; 250/227.1–227.18; 385/15–17, 141–147
See application file for complete search history.

(56) References Cited

U.S. PATENT DOCUMENTS 5,343,286 A * 8/1994 Keeble et al. .............. 356/73.1

OTHER PUBLICATIONS

Furukawa et al. "Enhanced Coherent OTDR for Long Span Optical Transmission Lines Containing Optical Fiber Amplifiers". May 1995, IEEE Photonics Technology Letters, vol. 7, No. 5, pp. 540-542.*

* cited by examiner

*Primary Examiner*—Tarifur Chowdhury
*Assistant Examiner*—Tara S Pajoohi
(74) *Attorney, Agent, or Firm*—James L. Kurka; Daryl R. Wright; Winstead PC (57) ABSTRACT

An optical time domain reflectometry apparatus for sensing a parameter in a region of interest is characterized in that the optical fiber includes a first section into which optical radiation at the probe wavelength is launched and a second section deployed in the region of interest. The first section has a higher intensity threshold for the onset of non-linear effects than the second section. The source launches the optical radiation into the first section at an intensity lower than the non-linear effects intensity threshold of the first section but higher than the non-linear effects intensity threshold of the second section. The attenuation characteristics of the first section are chosen such that the intensity of the optical radiation at the probe wavelength that reaches the second section is below the threshold for the onset of non-linear effects of the second section.

23 Claims, 3 Drawing Sheets

OPTICAL TIME DOMAIN REFLECTOMETRY FOR TWO SEGMENT FIBER OPTIC SYSTEMS HAVING AN OPTICAL AMPLIFIER THEREBETWEEN

RELATED APPLICATIONS

This application is a division of U.S. application Ser. No. 10/502,616, filed Jul. 26, 2004, now U.S. Pat. No. 7,304,725, which is a national stage filing of PCT International Application Number PCT/GB03/00385 filed on Jan. 30, 2003, which claims priority to Great Britain Application No. 0202159.0, filed Jan. 30, 2002. All of these patent applications are incorporated by reference herein in their entireties.

FIELD OF THE INVENTION

The present invention relates to optical fiber sensors based on optical time-domain reflectometry (OTDR) in which a pulse or series of pulses is launched into the fiber and the signal is returned to the launching end and originates in reflected or scattered light in the fiber.

BACKGROUND

One example of such sensors is the Raman OTDR sensor from which temperature profiles can be determined from the intensity distribution of the backscatter signal measured as a function of time from launching the probe pulse, or equivalently, distance along the fiber. OTDR technology is used very commonly in telecommunications for assessing the quality and integrity of optical fiber links. In this case, the link is defined by the requirements of the communications system and the OTDR must be designed to cope with the optical fiber system as specified. In the application of OTDR for sensors, however, there is far more flexibility to select the optical fiber system and its interconnection to suit the requirement of the OTDR-sensor designer.

It is known that the performance of OTDR sensors is limited by the power that can be launched into the fiber, owing to the existence of non-linear optical effects. The origin of these non-linear optical effects varies depending upon the characteristics of the probe pulse. For short pulses having a broad spectral width, the dominant effect is usually stimulated Raman scattering (SRS). For longer pulses, with narrower spectral widths, the dominant effect is generally stimulated Brillouin scattering (SBS). For short narrowband pulses, the limiting effect is generally self-phase modulation (SPM), in those cases where the pulse is required to maintain a narrow spectral width. A more detailed explanation of these effects may be found in the literature, for example G. P. Agrawal "Nonlinear fiber" optics Academic Press 1995 ISBN 0-12-045142-5.

The limited power which can be launched into an optical fiber for OTDR-type measurements is a serious limitation on the performance of these systems. The signals received for interrogation pulse in these systems are typically very weak; typically only a few photons are returned in the intended signals from the most remote points of interest in the system. Since the signal received is proportional to the power of the probe pulse, it is clear that an ability to increase the power in the probe pulse will result in a higher performance. Alternatively, if the amount of power that is returned for a given launched power could be increased, then the signal-to-noise ratio could be increased and thus the measurement quality improved. Finally, it should be realized that OTDR measurements are usually averaged over a large number of measurements in order to improve the signal to noise ratio, the latter quantity improving as the square root of the number of measurements averaged. Thus an improvement in the signal-to-noise ratio resulting from a higher power launched can be used to obtain faster update times on the measurement.

It is therefore desirable to provide methods and apparatus to improve the signal-to-noise ratio in OTDR measurements from the section of fiber which is of interest, where this section is separated from the instrumentation by a finite distance. It is frequently the case that the most important section is at the most remote end of the fiber. Whilst the closer sections of fiber may also require to be measured, the present invention concentrates on the improvement of the measurement quality of a remote section of fiber.

The main reason for concentrating on improving measurement at the remote end of the fiber is that this is where the attenuation suffered by the probe pulse in the outbound direction and the signals in the return direction are the highest. There are, moreover, applications where the final section is of primary interest and where the data quality at closer distances is less important. One example of such applications is the measurement of temperature profiles in sub-sea oil wells. In this case, it is important to know the temperature of the fluids flowing in the well to, typically, 0.1° C. However, the equipment is typically located on a platform which is sited some distance away from the well, the well being connected to the platform by a sub-sea flowline which lies on (or is buried within) the sea bed, a riser taking the oil from the flowline up to the platform. The horizontal distance between the platform and the sub-sea well head is known as the "step-out" distance. In a typical example of wells being planned for deep water oil production, the well might extend up to 10 km below the seabed. The step-out distance could be as high as 20-30 km and the water depth can reach 2000 m and may in future exceed this value. In this example, it is the section of optical fiber in the well, the final 10 km, which is important. The fiber which connects the platform with the well head is of lesser importance: it may convey information about blockages in the flowline, but the temperature resolution required for the purposes of flow assurance in the flowline is far less demanding than that required in the well.

In order to provide further background to the invention, the relationship between the maximum power which can be launched in the fiber and the resulting backscatter power will be discussed.

The resolution of the measurand (e.g. temperature) of OTDR-type sensors, such as the Raman OTDR or Brillouin OTDR, is generally determined by the signal-to-noise ratio of the backscattered signal. A further discussion of this point may be found in the textbook "Optical Fibre Sensor Technology" edited by Grattan and Meggit (Chapman & Hall, London, 1995, ISBN 0 412 59210 X) and especially in the Chapter on distributed fiber optic sensors. To summarize, the signal returned in such a sensor is proportional to probe pulse energy. In order to increase the pulse energy, either the pulse duration or the pulse power can be increased. In the former case, the spatial resolution (i.e. the ability of the sensor to distinguish closely-spaced features on the profile of the measurand) is degraded. In the latter case, the peak power is limited by non-linear effects which convert the probe pulse to different wavelengths from that launched, when the power is increased above certain limits.

In general, it is the intensity of the optical power in the fiber which defines the onset of non-linear effects. By intensity, it is meant the ratio of the optical power launched divided by the area over which this power is spread. Since the optical power is not uniform, an "effective" area is usually defined as follows $$A_{\mathit{eff}} = 2\pi \frac{\left[\int_0^\infty r\psi(r)^2 \, dr\right]^2}{\int_0^\infty r\psi(r)^4 \, dr}$$

where $\phi(r)$ represents the electric field distribution as a function of the radial co-ordinate r. The non-linear effects scale inversely with Aeff. It follows that for a given limit at which the non-linear effects become unacceptable, the power which can be launched into the fiber increases in proportion to Aeff. It turns out however, that the backscatter factor, i.e. the ratio of the backscatter signal power to the energy of the probe pulse, is inversely proportional to Aeff. It follows that if the fiber design is changed to increase Aeff, more power can be launched into the fiber, but the fraction of the pulse energy which is converted into a backscatter signal is reduced roughly in proportion to the increase in Aeff, resulting in backscatter signal which is unchanged. Whilst the dopants used to modify the refractive index cause the relationship to deviate somewhat from proportionality with Aeff, the above discussion remains valid, at least approximately. Some of the effects scale further still. For example, for small additions of GeO2 to silica, the core index increases proportionately to the molar concentration of GeO2, leading to an effective area which is reduced as the inverse square of the GeO2 concentration. However, the threshold for stimulated Raman scattering is reduced in a similar proportion because the Raman gain cross section and the spontaneous Raman scattering (from which the stimulated Raman scattering emerges) are both proportional to GeO2 concentration.

The previous paragraph uses terms that relate to single mode fibers; however, it will be understood that the same principles apply to multimode fibers.

SUMMARY OF THE INVENTION

According to a first aspect of the present invention there is provided an optical time domain reflectometry apparatus, for sensing a parameter to be measured in a region of interest, which apparatus comprises: an optical fiber; source means operable to launch optical radiation into the optical fiber at a probe wavelength; and detection means operable to produce electrical output signals in response to optical radiation backscattered from the optical fiber; characterized in that the optical fiber comprises a first section, into which the said optical radiation at the probe wavelength is launched, and a second section deployed in the region of interest, the said first section having a higher intensity threshold for the onset of non-linear effects than the said second section, the said source means being operable to launch optical radiation at the probe wavelength into the said first section at an intensity lower than the non-linear effects intensity threshold of the said first section but higher than the non-linear effects intensity threshold of the second section, the attenuation characteristics of the first section being such that the intensity of the optical radiation at the probe wavelength reaching the second section is below the threshold for the onset of non-linear effects of the said second section.

According to the first aspect of the present invention there is also provided an optical time domain reflectometry method of sensing a parameter to be measured in a region of interest, which method comprises launching optical radiation at a probe wavelength into an optical fiber and producing electrical output signals in response to optical radiation backscattered from the optical fiber, characterized in that the optical fiber comprises first and second sections, the second section having a lower intensity threshold for the onset of non-linear effects than the first section, the said second section being deployed in the region of interest and optical radiation at the probe wavelength being launched into the said first section at an intensity lower than the non-linear effects intensity threshold of the first section but higher than the non-linear effects intensity threshold of the second section, the attenuation characteristics of the said first section being chosen so that the intensity of the optical radiation at the probe wavelength reaching the second section is below that of the non-linear effects intensity threshold of the said second section.

According to a second aspect of the present invention there is provided an optical time domain reflectometry apparatus, for sensing a parameter to be measured in a region of interest, which apparatus comprises: an optical fiber; source means operable to launch optical radiation into the optical fibers at a probe wavelength having a preselected intensity; and detection means operable to produce electrical output signals in response to optical radiation backscattered from the optical fiber; characterized in that the optical fiber comprises a first section, into which optical radiation at the said probe wavelength is launched, and a second section deployed in the region of interest, there being a remote amplifier arranged between the first and second sections which is operable to compensate for attenuation losses in the intensity of the probe wavelength in the said first section.

According to the second aspect of the present invention there is also provided an optical time domain reflectometry method of sensing a parameter to be measured in the region of interest, which method comprises launching optical radiation at a probe wavelength with a preselected intensity into an optical fiber and producing electrical output signals in response to optical radiation backscattered from the optical fiber, characterized in that the optical fiber comprises first and second sections connected together by a remote amplifier, the gain of the amplifier being selected so as to compensate for attenuation losses in the probe wavelength in the first section.

According to a third aspect of the present invention there is provided optical time domain reflectometry apparatus, for sensing a parameter to be measured in a region of interest, which apparatus comprises: an optical fiber; source means operable to launch optical radiation into the optical fiber at a probe wavelength; and detection means operable to produce electrical output signals in response to optical radiation backscattered from the optical fiber; characterized in that the optical fiber comprises a first section, into which the said optical radiation at the probe wavelength is launched, and a second section deployed in the region of interest, the first section being optically connected to the second section at a location remote from the source means and comprising first and second fibers, the first fiber being arranged so as to convey optical radiation at the probe wavelength towards the second section and the second fiber being arranged so as to convey the backscattered optical radiation returned from the second section to the detecting means.

BRIEF DESCRIPTION OF THE DRAWINGS

Reference will now be made, by way of example, to the accompanying drawings, in which.

DETAILED DESCRIPTION

Figure 1:
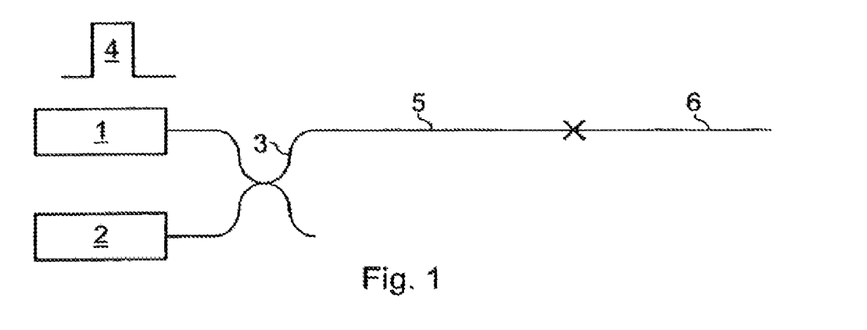
FIG. 1 shows OTDR apparatus according to a first embodiment of a first aspect of the present invention.

According to an embodiment of a first aspect of the invention, a method can be provided in which the backscatter power from the remote end of an optical fiber can be increased, whilst allowing the power launched into the fiber to remain below non-linear limits. In this method, the optical fiber is made up of at least two sections of fiber, such that the numerical aperture increases monotonically with increasing distance from the instrumentation. This method is illustrated in FIG. 1, where an OTDR backscatter measuring apparatus, represented schematically by a source 1, detector 2 and coupler 3, launches high power pulses 4 into a first fiber 5. The intensity of pulses 4 is selected to be below the threshold for the non-linear effects of relevance (depending on the application of the system and its design, the limiting effects could be SRS, SBS, SPM or others). The section of primary interest is a second fiber 6 which is connected to fiber 5 at a distance Lf. Fiber 5 is selected so as to have a high threshold for non-linear effects (and therefore, a low backscatter factor) and fiber 6 a significantly lower threshold (and thus a high backscatter factor), the relationship between the distance Lf and the effective areas of fibers 5 and 6 being so arranged that the power propagating in fiber 6 has been attenuated by its propagation through fiber 5 and that it is below the non-linear threshold in fiber 6, even though it would be above that threshold in the event that it were launched directly into fiber 6 without passing through fiber 5. Thus the attenuation of fiber 5 is used to bring the intensity of pulses 4 down to a level that can be accepted by fiber 6 without non-linear effects. Since in certain applications the distance covered by fiber 5 is required in any case to reach the start of fiber 6, the benefits of this method can be substantial.

As an example of the benefit that can be gained from this method, the numerical aperture (a quantity which relates to the index-difference between core and cladding) of a long distance fiber is typically 0.12 and the corresponding mode-field diameter is of order 11.5 μm. However, for special applications, fibers having numerical apertures as high as 0.29 are available. Since the effective area is inversely proportional to the square of the numerical aperture, and the backscatter factor proportional to its square, it will be seen that, for the same launch power, substituting a fiber of higher numerical aperture at a distance where the probe power has fallen by a factor equal to at least the square of the ratio of the numerical apertures of the first and second fibers will result in an increase in the signal received by a square of said ratio. In the example given above, the improvement in the signal received is approximately a factor of 6.

It is usually the case that fibers having a large numerical aperture (small effective area) suffer from somewhat higher transmission losses than fibers having larger effective areas. The location of the junction between fibers 5 and 6 can therefore be optimized. Furthermore, it is generally desirable to arrange for the change in effective area to occur over several steps. The reasons for changing the properties of the fiber from large to small Aeff in several steps are that the splicing losses are typically lower and, furthermore, the length of highest loss (with the lowest Aeff) is thereby minimized. In the extreme example, the fiber properties would be tapered so that the losses attributable to the change in fibers properties would be zero since the changes would take place adiabatically and secondly the loss/Aeff relationship along the fiber can be optimized.

A method for selecting the relative lengths of each section, in a fiber consisting of sections of fiber having a progressively increasing numerical aperture, is described below.

Given a known ratio between the backscatter level in the ith and (i+1)th section, the splice loss between them and the attenuation per unit length of the (i+1)th section, then the optimum length for the (i+1)th section may be derived from the following considerations. The shorter the length of the (i+1)th section, the higher the backscatter returning from its remote end will be. However, if this section is very short, then the backscatter signal from the remote end of the previous section will be weaker than that from the end of the (i+1)th section. It follows that the optimum length of the (i+1)th section is given by:

$$Lopt_{i+1} = \frac{10 \cdot \log\left[\frac{B_{i+1}}{B_i} \cdot \frac{\alpha_{S_{i+1}}}{\alpha_{S_i}}\right] - S_{i,i+1}}{\alpha_{i+1}}$$

where B is the backscatter capture fraction (i.e. that proportion of the scattered light which is re-captured by the waveguide in the return direction), $\alpha s$ is the scattering loss for the spectral component used in the measurement, S represents the splicing loss between section i and section i+1 and $\alpha$ is the total loss of the section. In all cases the values which vary between sections are identified by the index of the section of interest. In this case, $\alpha$ is expressed in dB/km, S in dB and $\alpha s$ is expressed in linear units (as a fraction of the forward traveling light which is scattered per unit length). The resultant optimal length for the (i+1)th section is subject to the following assumptions: (1) that the resulting length is less than the length of the critical length of interest to be measured with the highest precision; if this condition is not met, then the optimum length is simply that of the final section of interest; and (2) that the power remaining in the probe pulse at the junction is below the onset of the non-linear effect which limits the system performance. If this condition is not met, then the junction between the two sections is moved further towards the remote end of the fiber. Moving the junction has two effects, namely to reduce the power in the final section when it is reached and also to increase the threshold for non-linear effects in that final section, since the threshold is dependent on the length of the final section.

Where more than two sections of differing fiber exist, the above procedure is repeated for all the junctions between fiber sections, starting at the most remote.

The above-described methods are entirely passive. However, similar benefits can be achieved using amplification means sited remotely from the instrumentation. According to a second aspect of the invention, the power from the remote sections of a fiber interrogated by an OTDR sensor can be increased by employing remote in-line optical amplification means to increase the power level in the final section and to amplify the signal returning from that section in the same amplifier. Although in the description below the amplifier is sited remotely and is preferably pumped remotely, a remote amplifier powered in the remote location from an electrical source (possibly driving a local pump source) is also possible.

A remotely pumped amplifier is a variant of optical amplifiers in which the pump power is transmitted along an optical fiber to the amplifier, which is thus electrically passive. Whilst remote amplifiers have been used extensively in telecommunications and in discrete sensor arrays (e.g. in time-domain interrogation of acoustic sensor arrays, U.S. Pat. No. 5,866,898) they have not to date been applied to OTDR-type sensors, especially not in temperature sensors based on Raman or Brillouin scattering. In the case of Raman scattering, the spectral width of the signal is extremely wide (of order 10-15 THz) which results in very high noise inputs from the amplifier. In the case of Brillouin scattering, it is necessary to filter the backscatter spectrum in order to gain any benefit from the technique. This may be why it has not been proposed to date.

An OTDR-type sensor embodying the second aspect of the present invention consists of at least a first section of fiber into which the pulses are launched, this first section being followed by at least a second section of fiber, the two sections being separated by an optical amplifier. The amplifier consists preferably of a section of fiber doped with a rare-earth ion which has the property of exhibiting gain at the probe and/or signal wavelengths when illuminated by light at an appropriate pump wavelength. In one preferred embodiment, the signal wavelengths are in the region from 1525 nm to 1580 nm and the amplifier consists of a length of single mode fiber doped with erbium ions. The amplifier is preferably pumped at a wavelength of about 1480 nm and preferably the pump light is transmitted along the same fiber as the probe and backscattered light. The erbium doped fiber amplifier is especially appropriate to the application envisaged in that the upper state-life-time of the Er ions is sufficient for the device to store significant amounts of energy and thus relatively low pump power can provide efficient amplification for the low fraction of the time (duty cycle) for which it is required.

Figure 2:
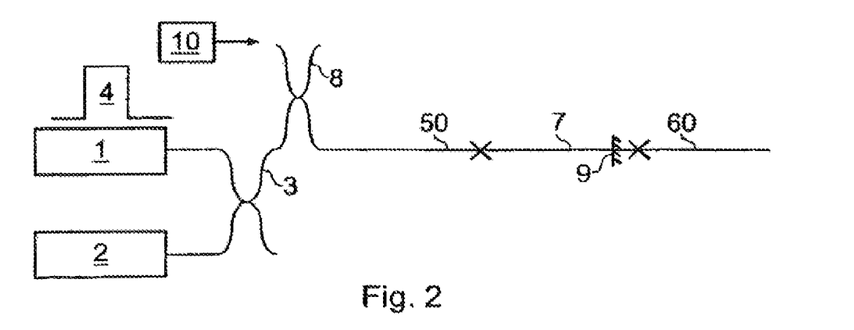
FIG. 2 shows OTDR apparatus according to a first embodiment of a second aspect of the present invention.

This configuration is illustrated in FIG. 2 in which a source 1 launches probe pulses 4 into a first section of fiber 50 through a directional coupler 3. At the end of section 5, a length of Erbium-doped fiber 7 is spliced in line with first fiber section 50 and then to a second section of fiber 60. A second, wavelength-selective, coupler 8 is used to launch pump light 10 into the fiber, coupler 8 being selected so as to transmit substantially all of the probe and backscatter signals unaffected and to couple into fiber 50 substantially all of the pump light, which is at a different wavelength from the other signals (probe and return signals). The pump light travels along fiber 50 and is absorbed in part by amplifier fiber 7. Optionally a wavelength-selective reflector 9 may be added at the remote end of the amplifier fiber 7 to reflect any unabsorbed pump power back through the amplifier, thus improving the efficiency with which the pump power is used. Reflector 9 is designed to have minimal effect on the transmission of all signals other than the pump itself. It is preferably implemented as a fiber Bragg grating. It should be noted that in this embodiment, the amplifier serves to increase the level of both the probe pulses and of signals returning from section 60.

If the gain of the amplifier is adjusted to compensate for the losses in the first section 50, then the performance of the system will be similar to that of a system measuring just the final section 60 with, however, the following penalties: a) the noise figure of the amplifier will degrade the signal-to-noise ratio, b) the pulse repetition frequency is limited by the total length of the fiber (sections 50+60) rather than the less restrictive limit dictated by section 60 alone and c) the power which can be launched into the first section 50 is always less than would be the case if only the final section 60 were measured owing to the longer length available for the build up of new wavelengths in the probe pulse (a precursor to the full development of optical non-linearity).

In a preferred embodiment the power level of the probe launched into the first fiber section is significantly below the level at which non-linear effects occur in that section and the amplifier gain is selected in such a way that its gain is greater than the attenuation of the first section, and that the probe power emerging from the amplifier into the second section is close to the limit of the power which can be accepted by said second section as determined by the limitations of non-linear optical effects in said second section.

Whereas it may be intuitively expected that the probe power must preferably be maximized, operating an OTDR-type sensor as just described has the following benefits. Certain types of non-linear effects in optical fibers build up gradually along the fiber. This build-up is delayed by reducing the power launched into the fiber section. As a result, the probe power in the section beyond the amplifier can be adjusted to a higher level than would be the case if the power level in the section preceding the amplifier had been close to the limit for that section. This benefit is illustrated in the following example, which is specific to single mode fiber. It is assumed that the limitation on the power launched results from self-phase modulation. It is also assumed that the section of interest is the final 10 km of a 30 km fiber, with the amplifier being placed immediately before the final 10 km, i.e. at 20 km from the instrumentation. It is further assumed that the maximum acceptable spectral broadening due to SPM is 500 MHz. It is also supposed that the gain of the amplifier is set to offset the loss of the first section only, that the power at the launching of the first section is maximized. Under these conditions, the probe power must be limited to a power of order 140 mW for 14 ns Gaussian-shaped pulses. In contrast, if only 50 mW were launched into the first section, then the amplifier gain could be adjusted to deliver 250 mW into the final fiber section, for a similar spectral broadening. Thus the design decision to limit the power in the first section allows a 78% increase in probe power in the section of importance. Similar benefits exist where the first limitation on power launched is due to stimulated Raman scattering. For example, where the gain of the remote amplifier is set to match the losses of the first section, then it is calculated that the maximum power which can be launched in order to keep the cumulative non-linear losses of the probe pulse below 0.3% (corresponding to 1° C. error for an intensity-based Brillouin system) is 0.9 W. However, if the power launched into the first section is restricted to significantly below 0.9 W, for example 0.1 W, then the amplifier gain can be adjusted to deliver 2 W into the second section for the same distortion level, i.e. an increase in the probe power in the section of fiber where it matters by a factor of more than 2.

A second benefit that is gained by operating the remote amplifier at a gain higher than is required to merely compensate for propagation losses in the first section applies to systems where the same amplifier is used for the signal returning from the second section. In this case, the stronger signal returning from the remote section of fiber can be arranged to eliminate the attenuation of further optical components in the receiving section of the opto-electronics and to dominate the noise of the pre-amplifying stage. Thus, an additional benefit equal to the sum (in logarithmic units) of the optical losses of the instrumentation prior to the next amplification stage plus the noise figure of that stage can be gained by reducing the probe power in the first section.

As a design example, it will be assumed that the preferred embodiment of an Erbium-doped fiber amplifier is adopted, which is remotely pumped with a 1480 nm laser, with the signals closely spaced near 1550 nm. Assuming 50 mW launched into a 20 km-long first section and stepped up to 250 mW at the amplifier, and allowing 4.8 dB of propagation losses in the first section, then the total gain required is 9.8 dB. The average power illuminating the amplifier is 2.1 µW, in addition to which 4 nW of backscatter power is expected in the return direction from the second section. Under these conditions, a length of approximately 8 m of the fiber type HE980 (supplied by Lucent Technologies of New Jersey, USA) will be sufficient to provide the gain required. Less than 2 mW of pump power would be absorbed and with 5 mW received at the amplifier, the noise figure is calculated to be about 4 dB. At 1480 nm the fiber losses in the first section are expected to be of order 0.25-0.3 dB/km, and therefore, it would suffice to launch 20 mW into the first section to deliver 5 mW to the amplifier. Alternatively, with the probe launch power reduced to 25 mW, 15 dB of gain is usable, which would be accomplished by a 12 m section of the same fiber pumped by 10 mW of optical power at 1480 nm (assuming that an optional pump reflector is installed). In this latter example, the signal from the second section is returned to the start of the first section with a strength 10 times that with which it would have emerged from the second section, and only a 4 dB noise penalty. The increased signal will significantly reduce the impact of the noise of the following amplification stage in the system.

Figure 3A:
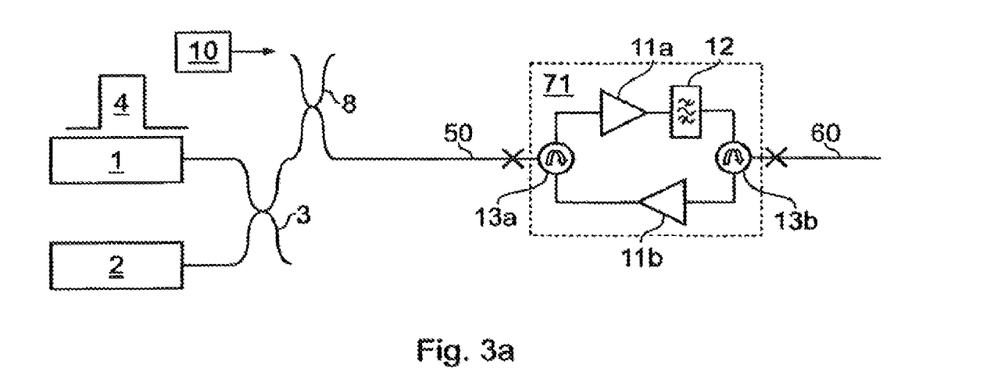
FIG. 3a shows OTDR apparatus according to a second embodiment of a second aspect of the present invention.

In certain circumstances, it may be desirable to perform certain optical functions remotely, such as filtering the probe signal prior to entering the final section. A filtering operation allows the effect of spurious light accompanying the probe pulse—such as broadening resulting from SPM in the first section—to be removed prior to the critical final section. In general, these functions must be applied to the probe pulse or the backscatter signal. In addition, it may be desirable to adjust the gain of a remote amplifier to be different for the probe pulses than for the signals returning from the second section. It may therefore be desirable to provide an optical sub-assembly sited remotely from the instrumentation and preceding a section of fiber which must be measured, in which the forward-travelling (probe) light is separated from the backward travelling light and processed prior to being launched into the final section of fiber. The light returning from the final section may also be processed (e.g. amplified) and returned to the instrumentation. The probe light travelling from the instrumentation to the sub-assembly may share the same fiber as the light returning from the sub-assembly. This arrangement is illustrated in FIG. 3a, in which a pair of circulators 13a, 13b have been used to separate the light on entering the sub-assembly 71, which includes amplifiers 11a and 11b and a filter 12, and to re-combine the light prior to leaving the sub-assembly. A circulator is a particularly efficient means of accomplishing this function, although a combination of directional couplers (to split the light) and isolators (to ensure unidirectional propagation) in the split paths is also possible. Depending on the specification of the splitting devices, it may be necessary to use pump by-pass couplers, which are similar to directional coupler 8 in that their wavelength selectivity allows the pump and other signals to be separated. For clarity these are not shown in FIG. 3a, but a more detailed view of the preferred arrangement for sub-assembly 71 is illustrated in FIG. 3b.

Figure 3B:
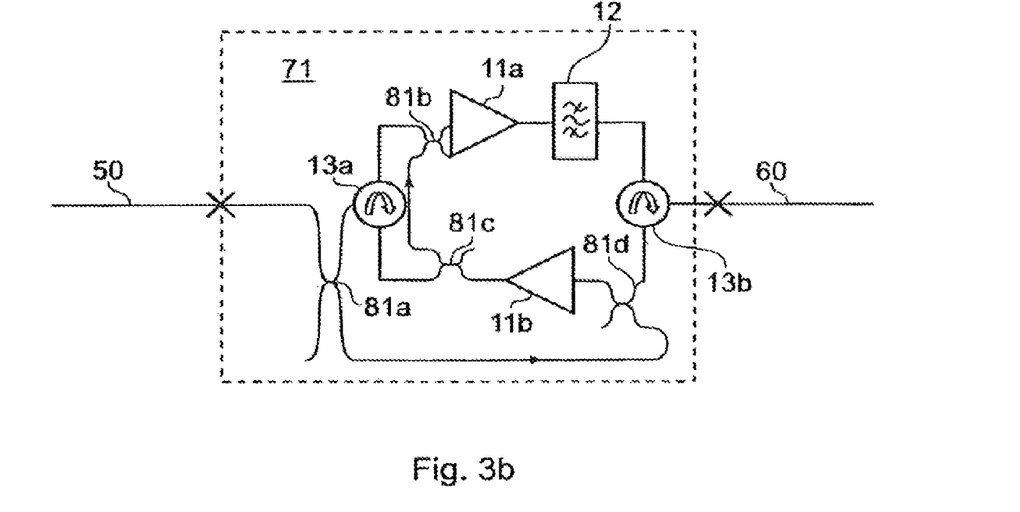
FIG. 3b shows part of the apparatus of FIG. 3a in more detail.

In FIG. 3b additional couplers 81a-d are shown. These serve to remove pump power fiber from the first section 50 immediately prior to the circulator 13a (these devices normally being unsuited to transmit both pump and signal) and re-launch the pump power into the amplifiers 11a, 11b as required. The pump power is routed along the path shown by the arrows, namely into one amplifier 11b (in this case the amplifier for the return signals, again the preferred option) and the remaining power then being removed from the signal path and then fed into the other amplifier 11a. Optionally, filter 12 can include a selectively reflective device which returns the residual pump power back through the amplifiers 11a, 11b in order to improve the efficiency of the pump usage.

The sensitivity of the losses of components in sub-assembly 71 must be carefully considered and it may be necessary carefully to scramble the polarization of the light sent to and/or returned from the said sub-assembly.

Alternatively, it may be preferable to convey the forward travelling probe power and the signals returning from the final section along separate fibers. For example, the remote optical sub-assembly may be linked to the instrumentation by at least two optical fibers connected to different ports on the instrumentation, at least one of these fibers serving to convey the probe pulse from the instrumentation to the sub-assembly and at least one fiber carrying the backward signals returning from the section of fiber to be measured through the sub-assembly and back to the instrumentation. One or more additional fibers may be used to convey pump power to a remote amplifier sited in the sub-assembly.

Whilst this arrangement requires two fibers in the cable prior to the remote sub-assembly (and thus adds cost) it eliminates the need for one set of splitting components and allows the remaining combining device to be extremely simple. It also allows for the fiber conveying the probe pulse to be optimized independently of that carrying the signals back to the instrumentation. Finally, it allows the pulse repetition frequency to be increased to reflect only the round trip propagation time in the final section, rather than along the entire distance from the instrumentation to the most remote end. As a result, the measurement time can, in the example of a 20 km step-out followed by a 10 km well—where only the well is to be measured—be reduced by a factor of approximately 3.

Figure 4A:
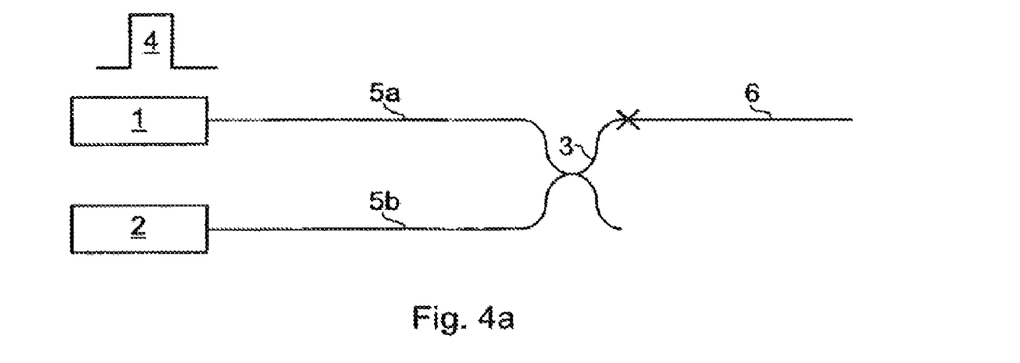
FIG. 4a shows OTDR apparatus according to a second embodiment of a second aspect of the present invention.
Figure 4B:
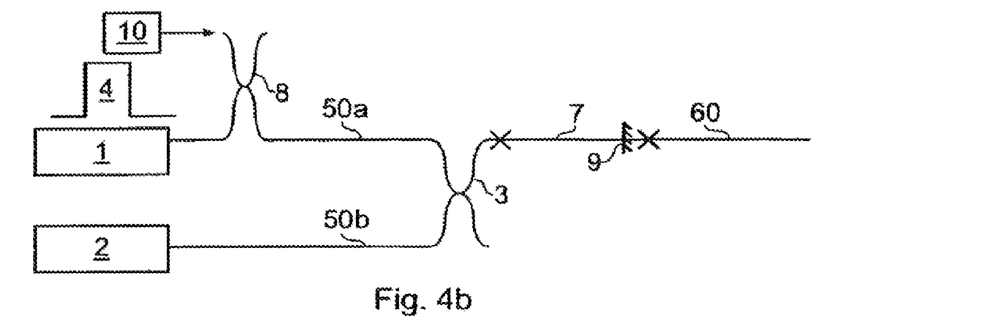
FIG. 4b shows OTDR apparatus according to a third embodiment of a second aspect of the present invention.
Figure 4C:
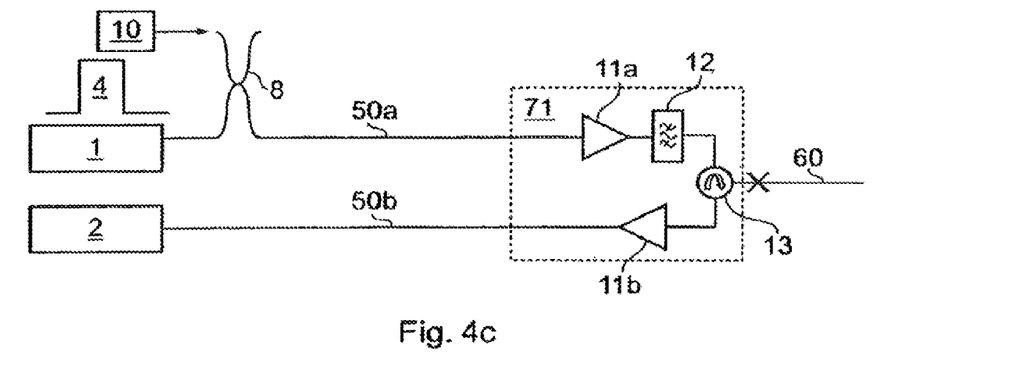
FIG. 4c shows OTDR apparatus according to a fourth embodiment of a second aspect of the present invention.

It will be clear that, although this arrangement is particularly advantageous when used in conjunction with the previously described aspects of the invention, as illustrated in FIGS. 4a-c below, the use of one fiber to transmit the probe pulse to a second section of fiber and of another fiber to transmit the backscattered signals from the second section of fiber to detecting means or the like could be advantageous regardless of whether methods embodying the first and second aspects of the present invention have been used to improve transmission along the second section of fiber.

FIG. 4a corresponds to the apparatus of FIG. 1, but differs in that interrogation pulses 4 emitted by source 1 are launched into a first fiber section 5a. Directional coupler 3 is now sited remotely, immediately prior to the region of interest in which section 6 is deployed. The signals returning from section 6 are routed through coupler 3 and back to the instrumentation through a separate fiber 5b. In accordance with the first aspect of the invention, the design of section 6 can be selected to exhibit a higher backscatter factor than that in section 5a.

FIG. 4b corresponds to the apparatus of FIG. 2, but like FIG. 4a differs in that the probe pulses are conveyed to the region of interest on a first fiber 50a and returned on a second fiber 50b, through a directional coupling device 3. The difference with respect to the arrangement of FIG. 4a is that an amplifying section 7 has been included between coupler 3 and fiber section 60. In this case, coupler 3 is designed to be wavelength selective, so that all of the pump power coupled into fiber 50a through coupler 8 and arriving at coupler 3 is directed into amplifying fiber section 7. The splitting ratio of coupler 3 at the signal and probe wavelengths may be selected to couple uneven fractions of power, which in conjunction with the adjustment of the gain of the remote amplifier 7 can be used to optimize system performance.

In the apparatus of FIG. 4c, which corresponds to that of FIG. 3a, there is provided a remote optical sub-assembly including separate paths for the probe pulses and the signals returning from the section of interest 60 which is connected to the instrumentation through separate fibers 50a and 50b, and to the section of interest 60 via a single circulator 13. Not shown in FIG. 4c are the couplers required in the remote sub-assembly 71 to remove the residual power in 11a, the amplifier connected to 50a, and then couple this power into the second amplifier 11b. Optionally pump-reflecting filters can be provided to improve the usage of the pump power. Coupler 8 may be inserted into fiber section 50b, rather than 50a as shown in FIG. 4c.

Figure 4D:
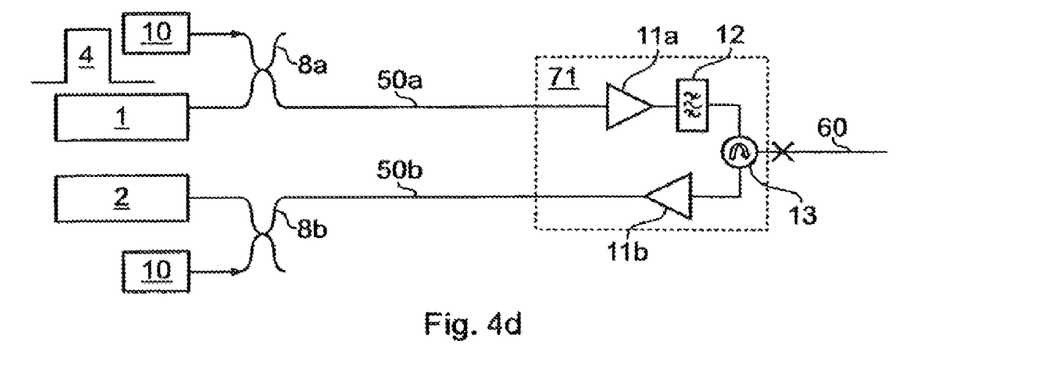
FIG. 4d shows OTDR apparatus according to a fifth embodiment of a second aspect of the present invention.

Alternatively, pump power can be conveyed independently along each of fibers 50a and 50b as illustrated in FIG. 4d. In this case, the pump power 10 is coupled into both fiber 50a and fiber 50b through separate wavelength-selective coupling devices 8a and 8b. The relative pump may be adjusted to adjust the relative gains of the power in each of the amplifiers 11a and 11b. In the case of FIG. 4d, the remote sub-assembly is simplified since no wavelength selective couplers are required to route the pump power between the amplifiers 11a, 11b, which will improve the reliability of the sub-assembly. A further simplification may be gained by replacing the single circulator 13 with a fused taper coupler (not shown). In the case of a fused taper coupler, the overall efficiency can be very high by arranging for an asymmetric splitting ratio, such as 90%/10%, in favor of the signals returning from section 60. Although the probe pulses are launched inefficiently in this arrangement, the availability of a local amplifier allows their power to be increased to compensate and the peak power launched can still be limited by non-linear effects in section 60.

What is claimed is:

1. An optical time domain reflectometry apparatus, for sensing a parameter to be measured in a region of interest, the apparatus comprising:
   an optical fiber;
   a source operable to launch optical radiation into the optical fiber at a probe wavelength having a preselected intensity, wherein the optical fiber includes a first section, into which the optical radiation at the probe wavelength is launched, and a second section deployed in the region of interest;
   detection means operable to produce electrical output signals in response to optical radiation backscattered from the optical fiber; and
   a remote amplifier arranged between the first and second sections which is operable to compensate for attenuation losses in the intensity of the probe wavelength in the first section, wherein the remote amplifier comprises a section of fiber doped with rare-earth ions, the fiber exhibiting gain at the probe wavelength when illuminated by the optical radiation at a pump wavelength and wherein the gain of the remote amplifier is selected to increase the intensity of the optical radiation transmitted into the second section to a value just below an intensity threshold for the onset of non-linear effects of the second section, thereby allowing the intensity of the radiation launched into the first section to be low compared to the intensity threshold for the onset of non-linear effects of the first section.

2. The apparatus of claim 1, wherein the remote amplifier comprises a single mode fiber doped with erbium ions.

3. The apparatus of claim 1, further comprising a wavelength-selective reflector provided at a remote end of the remote amplifier for reflecting any unabsorbed optical radiation at the pump wavelength back through the remote amplifier.

4. Apparatus as claimed in claim 3, wherein the reflector preferably comprises a fiber Bragg grating.

5. The apparatus of claim 1, wherein the remote amplifier forms part of an optical sub-assembly provided between the first and second sections, the sub-assembly operable to separate the optical radiation at the probe wavelength from the backscattered optical radiation and transmit it, via the remote amplifier and filtering means for filtering out optical radiation at unwanted wavelengths, into the second section.

6. The apparatus of claim 5, wherein the optical sub-assembly further includes a second amplifier for amplifying backscattered optical radiation returned from the second section.

7. The apparatus of claim 5, wherein the optical sub-assembly further comprises a first and a second input/output circulator optically connected to the first and second sections respectively.

8. The apparatus of claim 7, wherein the first input/output circulator is connected to the first section by a directional coupler, the directional coupler arranged to transmit optical radiation at the pump wavelength to the remote amplifier.

9. The apparatus of claim 5, wherein a length of the second section of the optical fiber is less than or equal to a length of the first section of the optical fiber.

10. The apparatus of claim 1, wherein the first section comprises a first and a second fiber, the first fiber being arranged so as to convey the optical radiation at the probe wavelength toward the second section and the second fiber being arranged to convey the backscattered optical radiation returned from the second section to the detecting means.

11. The apparatus of claim 10, wherein the optical radiation at the pump wavelength is also launched into the first fiber of the first section.

12. The apparatus of claim 1, wherein a length of the second section of the optical fiber is less than or equal to a length of the first section of the optical fiber.

13. An optical time domain reflectometry apparatus, for sensing a parameter to be measured in a region of interest, the apparatus comprising:
   an optical fiber;
   a source operable to launch optical radiation into the optical fiber at a probe wavelength having a preselected intensity, wherein the optical fiber includes a first section, into which the optical radiation at the probe wavelength is launched, and a second section deployed in the region of interest;
   detection means operable to produce electrical output signals in response to optical radiation backscattered from the optical fiber; and
   a remote amplifier arranged between the first and second sections which is operable to compensate for attenuation losses in the intensity of the probe wavelength in the first section, wherein the remote amplifier comprises a section of fiber doped with rare-earth ions, the fiber exhibiting gain at the probe wavelength when illuminated by the optical radiation at a pump wavelength and wherein the remote amplifier forms part of an optical sub-assembly provided between the first and second sections, the sub-assembly operable to separate the optical radiation at the probe wavelength from the backscattered optical radiation and transmit it, via the remote amplifier and filtering means for filtering out optical radiation at unwanted wavelengths, into the second section.

14. The apparatus of claim 13, wherein the remote amplifier comprises a single mode fiber doped with erbium ions.

15. The apparatus of claim 13, further comprising a wavelength-selective reflector provided at a remote end of the remote amplifier for reflecting any unabsorbed optical radiation at the pump wavelength back through the remote amplifier.

16. Apparatus as claimed in claim 15, wherein the reflector preferably comprises a fiber Bragg grating.

17. The apparatus of claim 13, wherein the gain of the remote amplifier is selected to increase the intensity of the optical radiation transmitted into the second section to a value just below an intensity threshold for the onset of non-linear effects of the second section, thereby allowing the intensity of the radiation launched into the first section to be low compared to the intensity threshold for the onset of non-linear effects of the first section.

18. The apparatus of claim 13, wherein the optical sub-assembly further includes a second amplifier for amplifying backscattered optical radiation returned from the second section.

19. The apparatus of claim 13, wherein the optical sub-assembly further comprises a first and a second input/output circulator optically connected to the first and second sections respectively.

20. The apparatus of claim 19, wherein the first input/output circulator is connected to the first section by a directional coupler, the directional coupler arranged to transmit optical radiation at the pump wavelength to the remote amplifier.

21. The apparatus of claim 13, wherein the first section comprises a first and a second fiber, the first fiber being arranged so as to convey the optical radiation at the probe wavelength toward the second section and the second fiber being arranged to convey the backscattered optical radiation returned from the second section to the detecting means.

22. The apparatus of claim 21, wherein the optical radiation at the pump wavelength is also launched into the first fiber of the first section.

23. The apparatus of claim 13, wherein a length of the second section of the optical fiber is less than or equal to a length of the first section of the optical fiber.

* * * * *